US010636055B2

(12) United States Patent
Koenig

(10) Patent No.: US 10,636,055 B2
(45) Date of Patent: Apr. 28, 2020

(54) SYSTEM AND METHOD FOR PROVIDING REWARD-DRIVEN TRANSACTION OPPORTUNITIES WITHIN AN EVENT

(71) Applicant: Eric Koenig, Huntington, NY (US)

(72) Inventor: Eric Koenig, Huntington, NY (US)

( * ) Notice: Subject to any disclaimer, the term of this patent is extended or adjusted under 35 U.S.C. 154(b) by 270 days.

(21) Appl. No.: 15/351,508

(22) Filed: Nov. 15, 2016

(65) Prior Publication Data

US 2018/0137535 A1     May 17, 2018

(51) Int. Cl.
*G06Q 30/02*          (2012.01)
*G06T 19/00*          (2011.01)
*G07F 17/32*          (2006.01)
*G06F 3/01*           (2006.01)
*A63F 13/61*          (2014.01)

(52) U.S. Cl.
CPC ......... *G06Q 30/0252* (2013.01); *A63F 13/61* (2014.09); *G06F 3/011* (2013.01); *G06Q 30/0209* (2013.01); *G06T 19/006* (2013.01); *G07F 17/3255* (2013.01); *G07F 17/3262* (2013.01)

(58) Field of Classification Search
None
See application file for complete search history.

(56) References Cited

U.S. PATENT DOCUMENTS

| | | | |
|---|---|---|---|
| 7,266,509 B2 * | 9/2007 | Koenig | G06Q 30/02 463/1 |
| 7,660,737 B1 * | 2/2010 | Lim | G06Q 30/02 705/14.49 |
| 9,814,986 B2 * | 11/2017 | Judkins | A63F 9/24 |
| 2013/0073387 A1 * | 3/2013 | Heath | G06Q 30/02 705/14.53 |
| 2015/0286313 A1 * | 10/2015 | Vandermeijden | G06F 3/044 345/174 |

* cited by examiner

*Primary Examiner* — Alexandru Cirnu
(74) *Attorney, Agent, or Firm* — Georgiy L. Khayet

(57) ABSTRACT

The current invention is a system where a user can interact with advertised content on numerous platforms via a plethora of devices while watching a promotional event, with the goal of driving sales to advertisers through rewards, by combining gaming, branded entertainment, and direct response. Users will receive product information through the inclusion of a variety of state-of-the-art methods that can be utilized in order to engage users. This is done in order to reach the consumer base and deliver relevant product information to them in dynamic ways: for example but not limited to, via audio and/or visual triggers, sending links through push notifications, providing information based upon user location, and personalizing AR/VR visuals based upon each user's profiled data.

16 Claims, 10 Drawing Sheets

The following are the product options for a sample scenario in the interactive content for the a hypothetical demo app:

| | Demo v1 |
|---|---|
| Plot / Theme | *Brand has selected 35 of the participants to engage with their products in a series of real world settings; the first is a run through the mountains of Colorado* |
| Product Scenario 1 | Select best sneaker for each given surface |
| Product Option(s) | 4 |
| Option 1 | Sneaker 1<br>Ideal for Asphalt and Concrete<br>Product information specific to this particular sneaker |
| Option 2 | Sneaker 2<br>Ideal for Track<br>Product information specific to this particular sneaker |
| Option 3 | Sneaker 3<br>Ideal for Treadmill<br>Product information specific to this particular sneaker |
| Option 4 | Sneaker 4<br>Ideal for Hills, Dirt & Trails<br>Product information specific to this particular sneaker |
| Reward | 20% Off Discount Code/Coupon |
| Expiration | 30 Days |

Fig. 6

SYSTEM AND METHOD FOR PROVIDING REWARD-DRIVEN TRANSACTION OPPORTUNITIES WITHIN AN EVENT

CROSS-REFERENCES TO RELATED APPLICATIONS (IF ANY)

None.

BACKGROUND

1. Field of the Invention

The present invention relates in general to a system and method for combining an event with a multi-media interactive game or story combining product advertisements. A seller of merchandise can advertise and sell products to the audience watching the performance or playing of the event or interactive game or story, and the audience members are afforded the opportunity to earn or win points, discounts, coupons, etc., that can be applied toward product purchases.

2. Description of Prior Art

Interactive multi-media events such as sporting event or games are known. For example, many events such as survival or sporting events are now streamed live. Meanwhile, gaming and television commercials known as "Infomercials" have become very popular in recent years where a half-hour long television program is actually a presentation that tries to sell a product, with demonstrations, customer testimonials, pricing information, ordering by mail information, music, etc. The Internet has also opened up a whole new avenue for the advertising and sale of products and services. Product manufacturers and advertisers are nevertheless always searching for new and better ways to market products and services.

The following U.S. patents are exemplary of prior art that relates generally to the foregoing technologies.

U.S. Pat. No. 7,054,831 discloses a system and method for combining interactive game with interactive advertising.

U.S. Pat. No. 7,266,509 discloses a system and method for combining interactive game with infomercial.

U.S. Pat. No. 5,848,399 discloses a computer system for allowing a purchaser and/or participant to purchase packaged goods at home.

U.S. Pat. No. 5,682,196 discloses a hyper-television system for integrating remote participants into a multimedia program.

U.S. Pat. No. 4,592,546 discloses a game of skill, such as football, playable by remote purchaser-participants in conjunction with a live event, such as a football game.

U.S. Pat. No. 5,813,913 discloses a game of skill, such as a television quiz show, playable by remote purchasers and/or participants in conjunction with a common game event where purchasers and/or participants are grouped as to skill level.

U.S. Pat. No. 5,830,067 describes a proxy player machine that enables users to participate in a game of random chance even though a user is not present at the site of the game. The device is located at a site where a game of chance takes place. A proxy player remotely purchases wagering chances, plays those chances, and reports the results of those games of chance to clients who are not present at the site where the game takes place. The proxy player may make gaming decisions according to the player's preferences. The device enables persons to remotely participate in games of chance, such as bingo.

U.S. Pat. No. 5,816,918 discloses a prize redemption system for games wherein in exchange for monetary input, prize credits are credited to a player based on the game outcome. A prize selection menu is displayed wherein the player may select a prize that has a prize cost within the player's prize credit amount. The player is dispensed a specific prize ticket that is redeemable for the selected prize.

To date, no known systems or methods exist that seek to combine the attributes of interactive games or stories with those of infomercials wherein a player or participant in the game or story is provided with selectable information during the game or story that relates to a vendor's products.

There is still room for improvement in the art.

SUMMARY OF THE INVENTION

The present invention provides a combination multi-media interactive game and infomercial, wherein a player and/or participant user is required to access and research product information as the interactive multi-media game is played.

It is an online portal where interactive gamefied branded content, or content combining branded entertainment, gaming, and direct response advertising, can be viewed and interacted with by the user. This online hub/platform of interactive gamefied branded content will also provide an eCommerce component, through which users can redeem the rewards they earn through engagement with the interactive gamefied branded content.

More particularly, at various intervals or levels of the game, the player and/or participant interfaces with an infomercial type advertising and product information stream that promotes goods and services that are thematically related to the game content at each interval. The result is a unique and entertaining approach to product marketing wherein potential purchasers not only enjoy learning about the advertised products, but also can earn discounts for the products through successful play of the game, earned in concert with viewing of the event.

The user can interact with the content on numerous platforms via a plethora of devices. The manner in which they receive the product information can be addressed with the inclusion of the following state-of-the-art methods that can be utilized in order to engage users, i.e. reach the consumer base and deliver information to them. The following speaks to delivering information via visual and/or audio triggers, sending links via text messaging, providing info based upon user location, and how AR/VR visuals can be personalized, based upon each user's profiled data.

This novel advertising medium will enable marketers to promote products through a combination of branded entertainment, gaming, and direct response seamlessly. This reward-driven integrated approach is designed to make advertised content more engaging for the consumer-by making them a part of the interactive content and rewarding them for their participation in real time.

To this point, the platform will include an ongoing reward system (through points, coupons, credit, etc.) that is point-of-sale redeemable, either online or at brick-and-mortar retail, facilitating both product awareness and fulfillment.

The inventive system and method is designed to encourage consumer feedback—while motivating them to engage dynamically in learning about a brand's products or services, through a reward-driven gamefied experience. The platform is designed to encourage consumers, through brand incentives, to continue their engagement with the branded content through this immersive entertainment and gaming platform.

The system also includes triggers to launch the interactive thematic gaming content:

1. New triggers to launch the interactive thematic gaming content, a. Graphic, via image recognition software (such as QR Codes, for example), b. Audio, via audio recognition software (such as Sound Codes, for example), c. Text-base, via image recognition software and/or hyperlink URL, and d. Video, via a combination of both image and audio recognition software.

The present invention thus provides a system and method that facilitate a unique marketing approach for the advertising and sale of goods and services that captivates the advertising audience by entertaining them with an interactive game, and rewarding them with product discounts and the like for successful research of products which they are interested in purchasing.

The innovative process is more efficient, effective, accurate and functional than the current art.

BRIEF DESCRIPTION OF THE DRAWINGS

Without restricting the full scope of this invention, the preferred form of this invention is illustrated in the following drawings:

FIG. 6 shows the process being used with shoes;

DESCRIPTION OF THE PREFERRED EMBODIMENT

There are a number of significant design features and improvements incorporated within the invention.

The current invention is an online portal where interactive gamefied branded content (content combining branded entertainment, gaming, and direct response advertising) can be viewed and interacted with by the user. This online hub/platform of interactive gamefied branded content will also provide an eCommerce component, through which users can redeem the rewards they earn through engagement with the interactive gamefied branded content.

The content on this "online interactive gamefied branded content network" will be in multiple product categories and entertainment genres, where the content is based on the user's input and interactions. The terms user, viewer, audience, audience member, player, participant, player-participant, and consumer may be used interchangeably herein.

Figure 1:
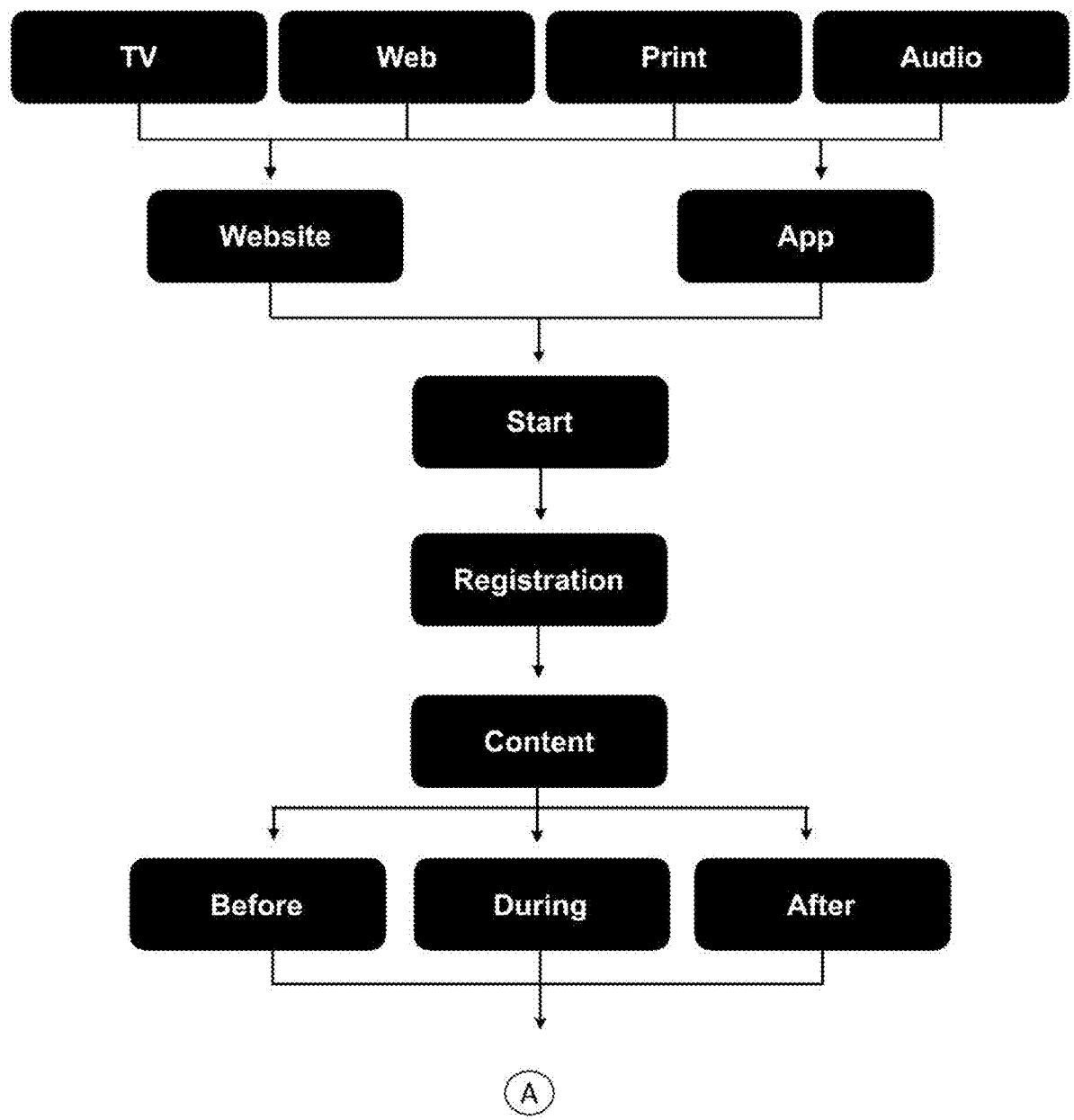
FIG. 1 is the first half of the outline of the process.
Figure 2:
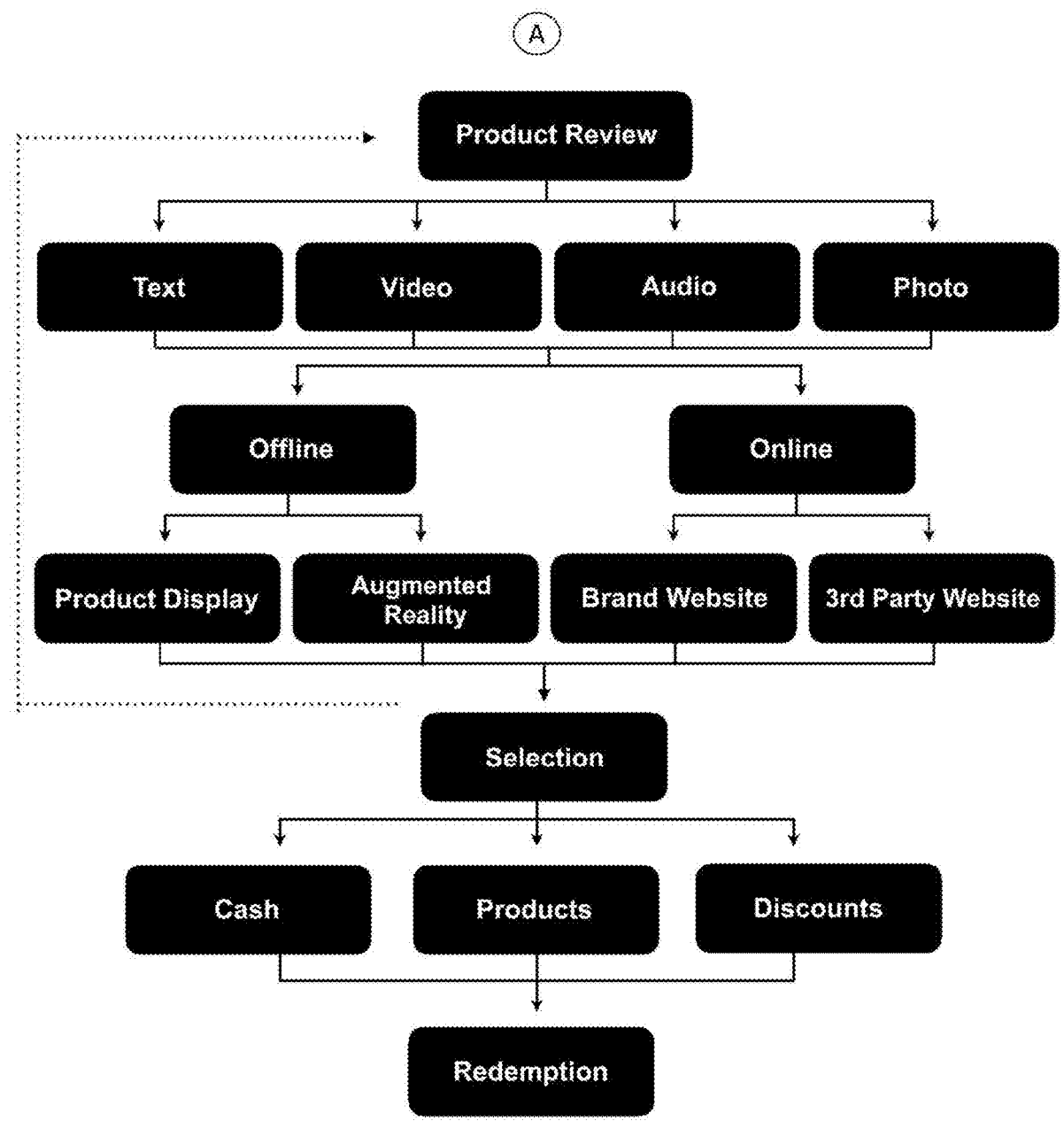
FIG. 2 is the second half of the outline of the process.

As shown in FIG. 1 and FIG. 2 the following outlines the process through which the consumer will interact and engage with the novel marketing platform.

The consumer views advertising on TV, online, in print, and/or through audio, for example, The consumer is directed to a brand's website or an app on their mobile device, The consumer begins engagement with the interactive consumer entertainment, The consumer creates a personal user account with their profiled data, The consumer chooses which branded content they wish to view (i.e. content/products that relate to them), Either before, within, or after the content, the consumer is presented with a scenario that requires the selection of one of the brand's promoted products or product features, The consumer reviews the product specs (through text, video, photos, and/or audio) provided by each brand to assist the consumer in finding the information they need to select the best-suited product during their interaction, The consumer can obtain this product information, either offline through a tangible product display or through an augmented reality virtual display in a retail setting, or they can access this product data online, either at the brand's website or through an affiliated third party website, for example, The consumer will then select the product(s) they believe is best suited for each given scenario during their engagement with the interactive branded content.

For their participation, the consumer will be incentivized by the brand and rewarded to promote repeat and/or continued interaction with this engaging advertising and marketing platform, and Once the consumer has received their rewards, they can redeem them with the brand (either through their online web-store or at their physical retail locations), or save them to their account (stored in the dedicated in-app bank, or other associated archive system, for later redemption).

Figure 3:
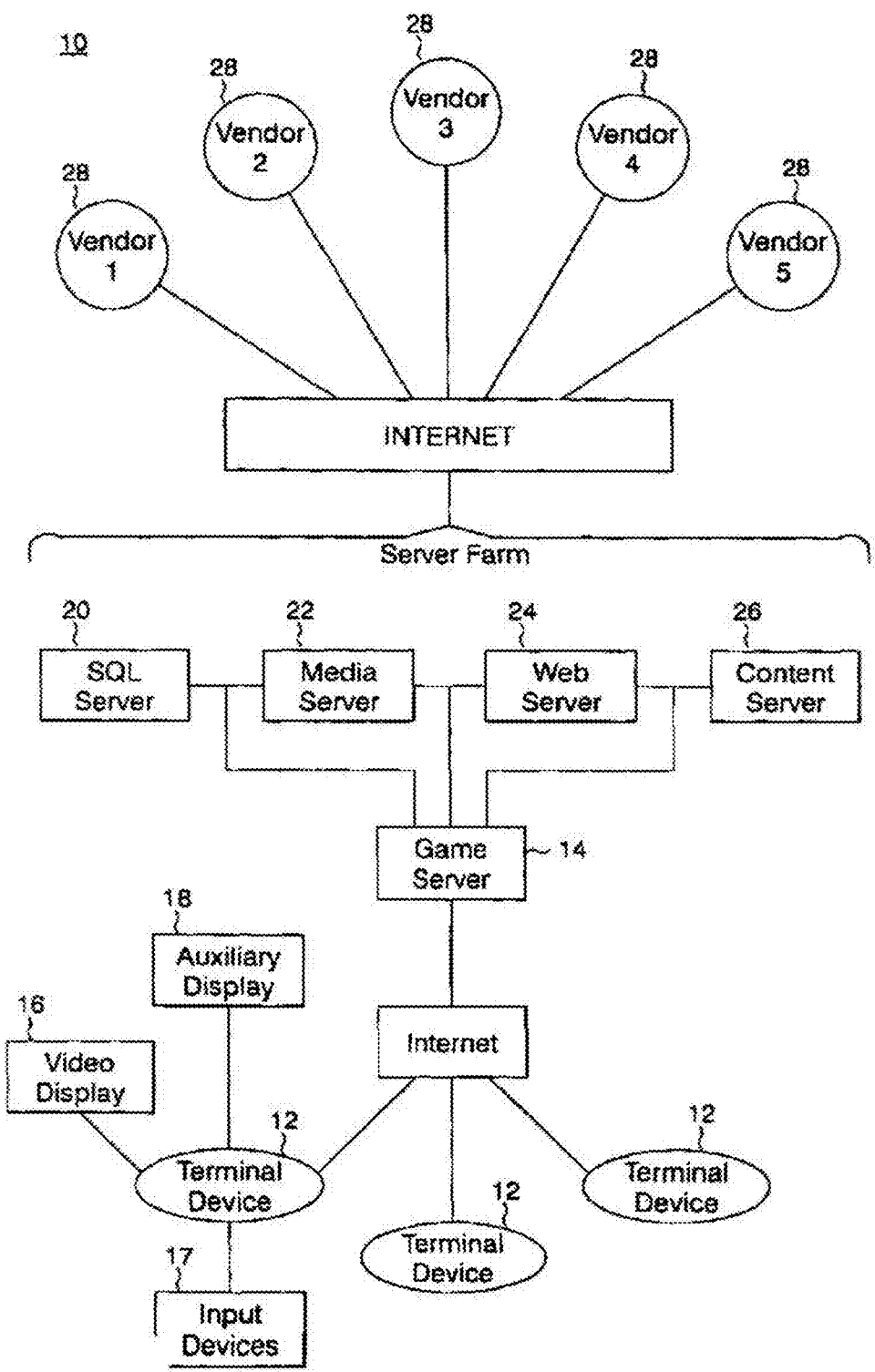
FIG. 3 is a block diagram of the hardware/software of a system for implementing an event, game and infomercial in accordance with a preferred embodiment of the present invention.

With reference to FIG. 3, a hardware/software block diagram of a streamed event or interactive game and infomercial system 10 is illustrated that is constructed in accordance with a first preferred embodiment of the present invention. The system 10 includes one or more terminal devices 12, one for each player or participant that communicate via the Internet with an event server 14. Each of the terminal devices 12 can be for example, a PC, a wireless communications device or a television, and includes a video display 16, and one or more input devices 17, such as a keyboard, a mouse, a joystick, a remote control, touchscreen, motion sensor, or biometric sensor. Additionally, other accessory I/O devices, such as an auxiliary display 18, can be interfaced to the terminal device 16 to provide players with additional tools that can be employed to enhance game play as discussed in greater detail later. Each of the terminal devices 12 runs an application that communicates directly with the game server 14 via TCP/IP protocol. Any conventional connection architecture can be employed for connecting the terminal devices 12 to the Internet, including, for example, dial-up, DSL, cable and wireless.

Figure 4:
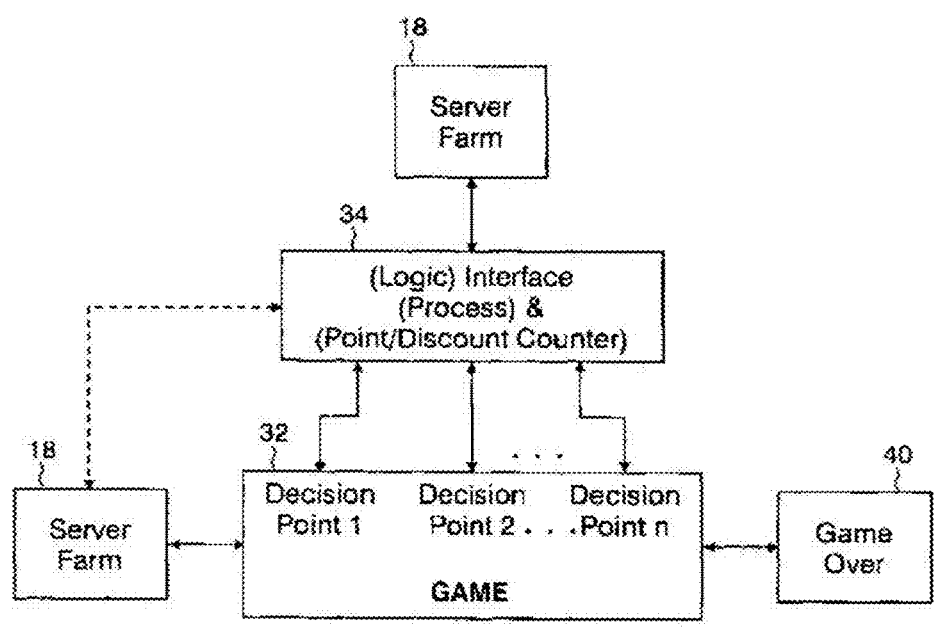
FIG. 4 is a flow chart showing the general operation of the combination event, game and infomercial of the present invention.
Figure 5:
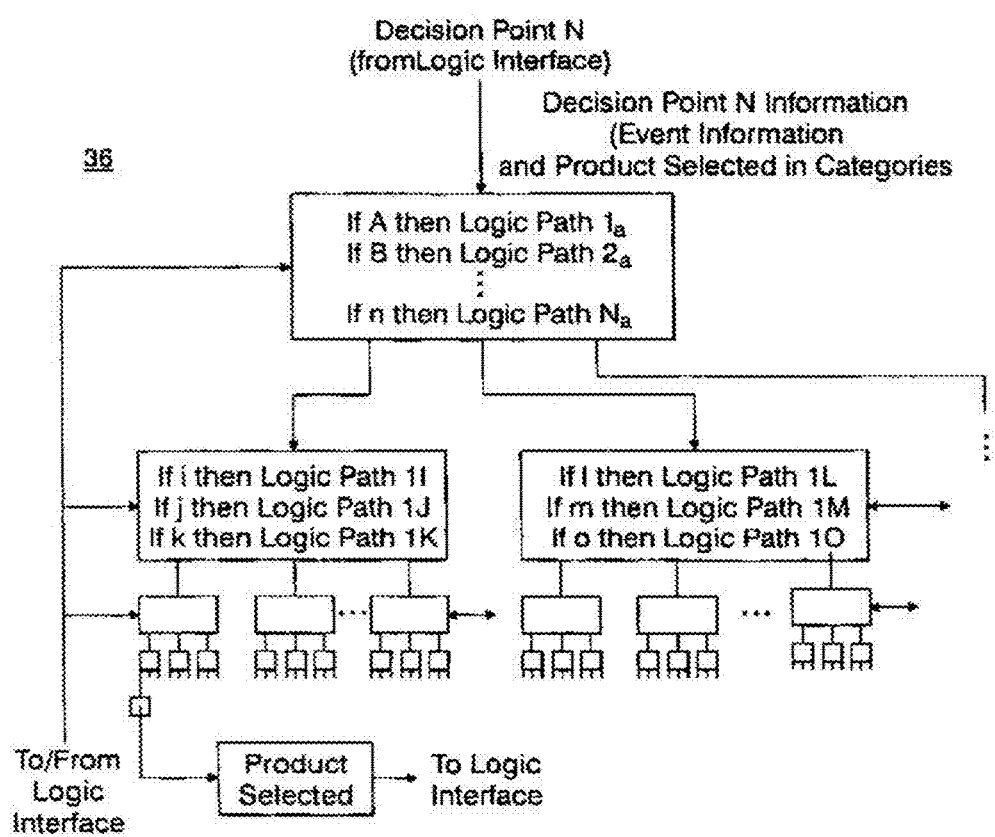
FIG. 5 is a detailed logic tree diagram that is carried out by a game server in the system of FIG. 3.
Figure 7:
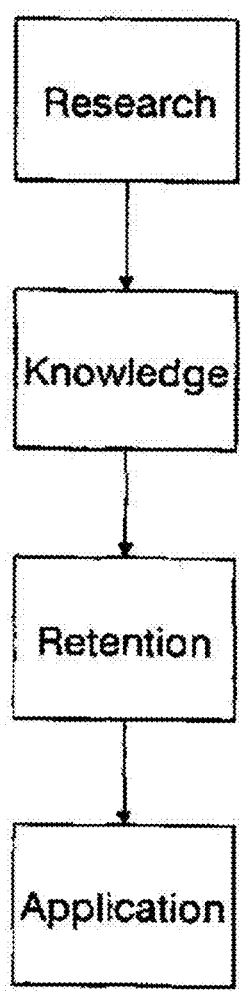
FIG. 7 is a flow chart showing the key steps that are employed by viewers of the event during research of a vendor's products.

As will be discussed in greater detail in conjunction with FIG. 4 and FIG. 5, the event server 14 controls the game session that is tied to the event, including user validation, game tracking and content serving. To facilitate this, the event server 14 is interfaced to a server farm 18 that includes a SQL server 20, a media server 22, a web server 24 and a content server 26. The SQL server 20 is preferably an off-the-shelf software database server that tracks the game players' or participants' names, etc., and their progress or level in the game, including their game scores, and information pertaining to the products they research during the game. The media server 22 creates real time video and audio content, and delivers it to the terminal devices 12. The web server 24 assembles various components and delivers them in any suitable code from, such as HTML, so that web pages may be downloaded to the terminal devices 12 as necessary to facilitate game play.

The content server 26 retrieves and stores (caches) product and service data from the web sites of each of a plurality of product and/or service vendors 28. The terminal devices 12 access this data at appropriate times during game play as will be discussed in greater detail later. It is also possible to access the product information directly from the vendors 28 when it is required, however, it is preferred that it be stored in the content server 26 to avoid difficulties that would arise if one or more of the vendors change their site content. As the players of the game review the various product descriptions, statistical information that is stored in the SQL server 20 is also sent back to the vendors 28.

It should be understood that the arrangement illustrated in FIG. 3, though preferred because of its use of the Internet, is not the only means of implementing the combined game and infomercial. For example, it is also possible to implement the game on a standalone PC where the game and product media may be pre-recorded on compact disk, computer hard drive or other storage media, or streamed to the PC from the media server. An Internet connection would still be preferred in this arrangement, however, to facilitate transfer of player statistics to the vendors 28, direct purchase of researched products after a player has concluded an event or game, accessing live or other media during play of the event, etc.

The event server 14 facilitates all communication with the viewers of the event or and those playing the game tied to the event, and invokes the appropriate one of the servers in the server farm 18 to accomplish a required task. With reference to FIG. 4 and FIG. 5, the process by which the event server 14 operates is illustrated. First, a viewer 30 enters the game 32 by logging on (e.g., entering user ID and password). The event server 14 validates the player through access to the SQL server 20. Next, the video or three-dimensional animation for the game 32 is downloaded or streamed from the media server 22 to the player's terminal device 12 and video display 16.

The event 32 may be either a streaming event such as a game or show, sporting event, race, or other competition.

As the event progresses, the player reaches a number of decision points where the player-participant is given clues that help them navigate to the next location. Preferably the interval location decision points of the game are visually displayed in three dimensions. The clues can be visual or directive in nature, i.e., go to desert, go to rainforest, go to Grand Central Station, go to house, go to web site, go to library, go to fantasy castle, go to information center, etc.

There the player and/or participant may be given further strategic or random generated options.

The viewers and player thus interacts with the infomercial by joining other users remotely in a virtual reality environment, by observing the products remotely, or, by shopping for the displayed products by Internet. When the viewer 30 makes a selection from a group of product choices or the product choice can depend on the event, for example, their selection is entered into a logic interface 34 in the game server 14. As illustrated in FIG. 3, the event server 14 runs a logic tree based application 36 that processes the selection information entered by the viewer 30, and includes a counter 38 for counting and accumulating items of value, such as points or discounts, which have been accumulated by the viewer 30.

At each decision point, 1 2 . . . n, the viewer 30 must exercise discretion and either proceed further to other decision points, or else access the inventory of various products and services contained in the content server 26, and presented in the infomercial portion of the combined game and infomercial of the present invention. The viewer 30 perceives information about certain thematic events, plus product selection and product category information.

At each interval location, the retail object for demonstration or sale is preferably related to the theme, i.e. story or plot, of each interval location in the event. For example, in a racing event, NIKE might try to sell specialized shoes. In a triathlon event, SPEEDO might demonstrate and/or sell swimwear. In a mountain racing event, RANGE ROVER might demonstrate or sell a motor vehicle or other product through a maze or other interval location. Thus, when the player and/or participant approaches a interval location in the event, such as a desert, a product such as PERRIER may be displayed. The product is coded so that the viewer and/or participant can access the product, such as a case of PERRIER water, to be delivered conventionally by shipping to the viewer and/or participant, or the player or participant can try and use the product in a virtual reality setting. The viewer and/or participant can use the input device(s) 18 to selectively tailor his or her order, and also to view and examine the products to be purchased. The process used to create these interval location scenarios is shown for a shoe product in FIG. 6.

The present invention may also allow a viewer and/or player to purchase goods displayed in the combination strategic game and infomercial at a remote location, such as at home. The event server 14 downloads or streams images of the products from the content server 26 to the terminal devices 12, and can keep track of the products in a remote distribution center.

The interactive consumer entertainment may also be non-commercial, such as an educational, inter personal, subliminal or other value-imparting project. In a non-commercial setting, such as a stress relaxation project, the participant and/or player can, at various decision points of the game, access information about relaxation techniques, such as how to replace muscularly stressful chest breathing with relaxing abdominal breathing.

A key point is that the event is preferably done remotely and streamed on the Internet.

Figure 8:
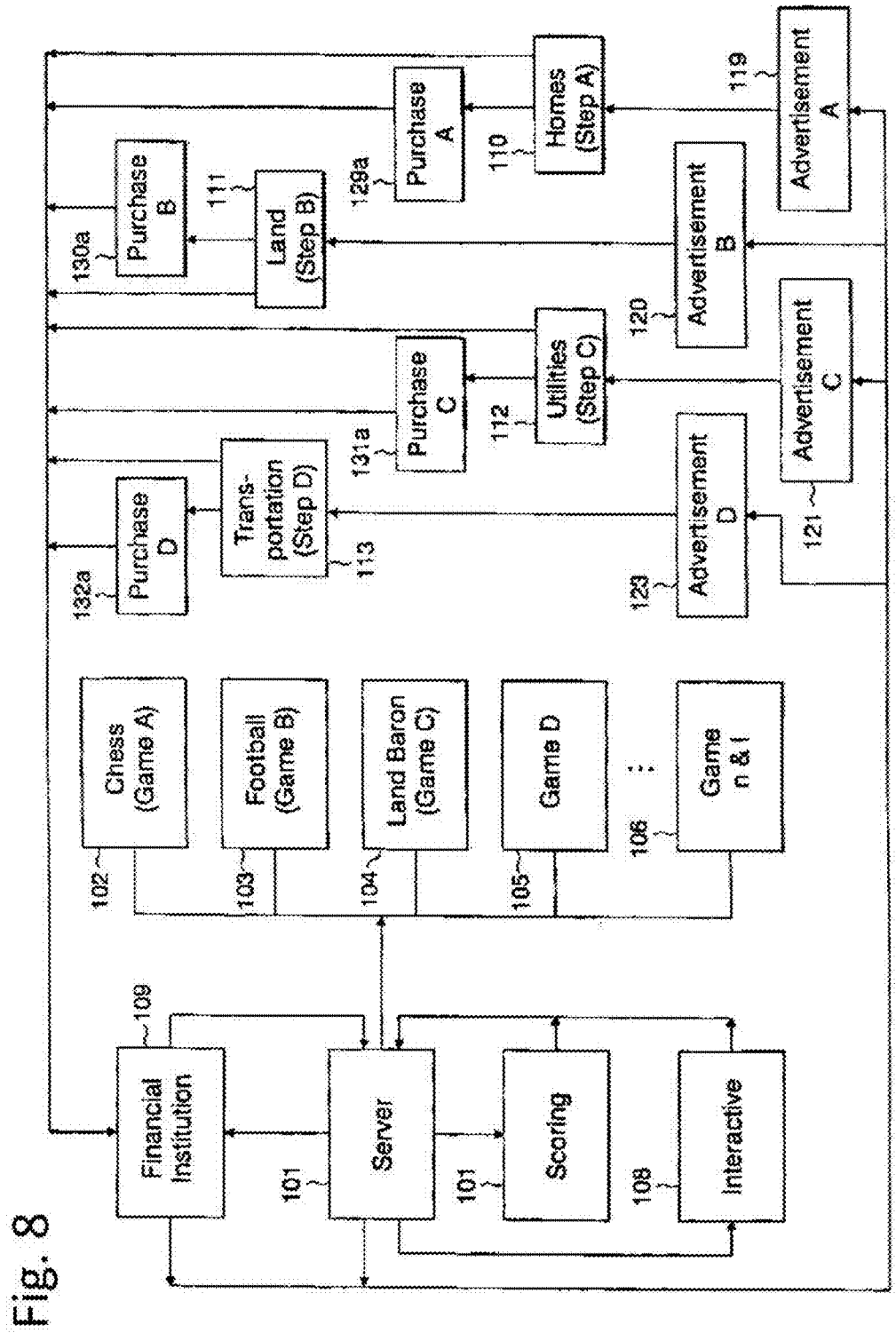
FIG. 8 is a flow chart of another embodiment for a combination multi-media interactive strategic game and video infomercial of the present invention.

FIG. 8 illustrates another embodiment of the present invention that can be employed for playing a plurality of different events in combination with infomercials or advertising. A system event server 101, such as an Internet server, a computer hard drive or compact disc or other means of communication, provides a user with a choice of various strategic or random games 102, 103, 104, 105 and 106. In this example, the reference numeral 102 represents a event "A" such as a race, reference numeral 103 represents another game "B" such as a football game, reference numeral 104 represents a cooking event "C", reference numeral 105 represents a further game D, and reference numeral 106 represents other events, which are all provided by server 101 to the user.

There is also provided a scoring means 107 which is controlled by the server 101 and an interactive graphic mode 108, both of which provide strategic rules and graphics to the user. However there is a further subset of the server 101, namely a financial institution 109 which supervises financial transactions between the player or participant and the server 101, whenever the player is presented with an infomercial type of sales solicitation at any number of intervals in the selected event.

Each of these steps A, B, C, D shown as reference numerals 110, 111, 112 and 113, are then further connected to advertisements 119, 120, 121, 122, which are appropriate for each interval location of the various steps. For example, if one is showing a desert scene then the advertisement might be from a provider of bottled water. So in effect the player, at these various interval locations, carries out the strategic games sequentially in whatever order at these various locations. The system provides a simulated created infomercial wherein the player goes from step to step of a chosen event and then is presented with various sales opportunities as in an infomercial.

The user then has the opportunity to observe products or to make purchases such as purchases 129a, 130a, 131a, and 132a corresponding to the advertisement 119, 120, 121, and 122 which also correspond to event steps 110, 111, 112 and 113, respectively.

Each of these product demonstration or purchase steps are then connected back to the financial institution 109, which can provide a clearing house means for connecting an advertiser to a credit card or other type of acquisition redemption means for the user to use a credit card or other means of payment to obtain goods or services shown in advertisements 119, 120, 121, and 122 at game steps 129, 130, 131, 132.

Thus, in the shopping mode at each various interval location decision point, the viewer is presented with a display of a virtual shelf of products which are generally related to the various intervals or steps of the event. The product database is connected with the financial institution 109 so that the viewer can browse and shop through various products of the advertisers and complete any financial transaction through the financial institution.

Each product is then identified by an identification means wherein a further file contains the identification mean so that the player can access the products and images thereof as well as select various products from a category of products. The player can also have means for retrieving information describing the selected products including visual displays thereof.

In addition, the viewer can interact with the content on numerous platforms via a plethora of devices. The manner in which they receive the product information can be addressed with the inclusion of the following state-of-the-art methods that can be utilized in order to engage users, i.e. reach the consumer base and deliver information to them.

The following speaks to delivering information via visual and/or audio triggers, sending links via text messaging, providing info based upon user location, and how AR/VR visuals can be personalized, based upon each user's profiled data.

1. New triggers to launch the interactive thematic gaming content
   a. Graphic, via image recognition software (such as QR Codes, for example)
   b. Audio, via audio recognition software (such as Sound Codes, for example)
   c. Text-base, via image recognition software and/or hyperlink URL
   d. Video, via a combination of both image and audio recognition software
   a. QR Code (Quick Response Code) is a type of matrix barcode (or two-dimensional barcode), or a machine-readable optical label that contains information about the item to which it is attached. A QR code uses four standardized encoding modes (numeric, alphanumeric, byte/binary, and kanji) to efficiently store data; extensions may also be used.

The QR code system became popular outside the automotive industry due to its fast readability and greater storage capacity compared to standard UPC barcodes. Applications include product tracking, item identification, time tracking, document management, and general marketing.

A QR code consists of black squares arranged in a square grid on a white background, which can be read by an imaging device such as a camera, and processed using Reed-Solomon error correction until the image can be appropriately interpreted. The required data are then extracted from patterns that are present in both horizontal and vertical components of the image.

QR codes can be used on various mobile device operating systems. These devices support URL redirection, which allows QR codes to send metadata to existing applications on the device. Many paid or free apps are available with the ability to scan the codes and hard-link to an external URL.

QR codes can be used to log in into websites: a QR code is shown on the login page on a computer or kiosk screen, and when a registered user scans it with a verified smartphone, they will automatically be logged in. Authentication is performed by the smartphone which contacts the server.

In this manner, when viewed through a mobile device with suitable image recognition software, certain images can trigger the interactive thematic gaming content to be displayed, either via app or website.

b. Sound Codes (which are sometimes referred to as audio watermarks or audio tags) are another applicable technology that relates to mobile marketing. Much like QR Codes, Sound Codes can be used to assist in mobile marketing by letting people interact and become more immersed with some form of advertisement collateral.

Sound Codes are audio signals of various formats and sometimes intentionally imperceptible to the human ear (ultra-high frequencies). When coupled with advanced sound wave decoding algorithms, Sound Codes can be used to transmit small amounts of data that are usually identifiers associated with additional content that is stored on the Internet and can be downloaded or streamed to mobile devices and computers.

As it relates to mobile marketing or even potentially mobile payments, Sound Codes are the audio equivalent of QR Codes, Bluetooth and NFC technology. Audio watermarks can actually be more efficient and cost-effective in the long-term because of its arguably simpler attributes. Microphones and speakers are on every device and that's important to point out. Leveraging these common electronic components to achieve new forms of communication with the help of some intermediary software is a great example of re-purposing simple technology to create advanced technology.

In this manner, when heard and analyzed through a mobile device with suitable audio recognition software, certain sounds can trigger the interactive thematic gaming content to be displayed, either via app or website.

c. Short Messaging Service (SMS) is a text messaging service component of phone, Web, or mobile communication systems. It uses standardized communications protocols to allow fixed line or mobile phone devices to exchange short text messages.

While SMS reached its popularity as a person-to-person messaging, another type of SMS is growing fast: application-to-person (A2P) messaging. A2P is a type of SMS sent from a subscriber to an application or sent from an application to a subscriber. It is commonly used by financial institutions, airlines, hotel booking sites, social networks, and other organizations sending SMS from their systems to their customers.

In this manner, when received via push SMS and "clicked" by the viewer, certain URLs or hyperlinks can trigger the interactive thematic gaming content to be displayed, either via app or website.

2. Geo-spatial technology
      a. Geo-fencing/GPS & RFID technology
      b. Beacon location (a form of proximity technology)
      a. Geo-fencing is a feature in a software program that uses the global positioning system (GPS) or radio frequency identification (RFID) to define geographical boundaries. A geofence is, in essence, a virtual barrier. Programs that incorporate geo-fencing allow an administrator to set up triggers so when a device enters (or exits) the boundaries defined by the administrator, a text message or email alert is sent. Many geo-fencing applications incorporate Google Earth, allowing administrators to define boundaries on top of a satellite view of a specific geographical area. Other applications define boundaries by longitude and latitude or through user-created andWeb-based maps.

In this manner, a marketer participating in the interactive thematic gaming content as a sponsor can geo-fence a retail store in a mall, for example, and send a coupon to a consumer who has downloaded the appropriate mobile app when said consumer customer crosses the virtual geo-fence boundary with their mobile device.

b. Beacon location (a form of proximity technology) operates as a small lighthouse, but instead of light, it uses radio waves, and instead of ships, it alerts smartphones of its presence. Beacons have a range of up to 70 meters (230 feet); phones or other smart devices can pick up a beacon's signal and estimate the distance between the device and beacon locator by measuring received signal strength (RSSI).

The beacon is not broadcasting continuously—it's blinking instead . . . the more frequent the blinks, the more reliable the signal detection. Beacons traditionally use Bluetooth Smart technology, which do not require pairing. This means a phone can listen to and receive information from multiple beacons at the same time . . . for example, finding one product in a store and receiving sales information about a product in the next aisle.

Beacon location technology can be used to deliver information to a consumer's mobile device while they're passing by a location or in-store. This includes, but is not limited to, product location, to include a turn-by-turn, aisle-by-aisle navigational map with onscreen visual cues (e.g. arrows); product information, to include price, quantity, availability, colors, sizes, demonstrable videos, etc.; and promotional information, to include flash sales, and other items that might be offered in real time while shopping in the store.

In this manner, when near a beacon programmed to deliver information related to the interactive thematic gaming content, the user can receive applicable information to their mobile device.

3. Discretely personalized and profiled media delivery with real time incentives.
      a. Users engaging with the interactive thematic gaming content can establish profiles with which to store accruable in-game credits or points, as well as earned product discounts, for example.
      b. These profiles may also to deliver profiled information to the user, for example but not limited to, displaying products to a user who has demonstrated interest in those products specifically or items similar to those products.
      c. Users may receive these reward and incentives for providing personal data which will enable the system to function at a higher accuracy (i.e. provide more relevant recommendations).
    4. Integrated dynamic AR/VR content
      a. Augmented Reality and Virtual Reality are both interactive and immersive visual technologies—but provide the user with two very different experiences. In Virtual Reality, the user is placed in a virtual world; an interactive 3D environment that displays a virtual computer-generated setting. In Augmented Reality, virtual items are placed in the real world; an interactive computer-generated image laid over the real world, viewed through a mobile device.
      b. In this manner, various aspects of the interactive thematic gaming content may be AR or VR in nature. For example but not limited to the following example, wherein the virtual "treasure hunt" or "scavenger hunt" aspect of the interactive thematic gaming content could venture from the digital landscape (desktops, laptops, and mobile devices) to real world brick-and-mortar retail locations, AR content can be displayed onscreen to the consumer when certain in-store product displays are viewed by the mobile device. This AR content could be related to the theme of the interactive thematic gaming content, and include profiled data about the consumer, displaying visuals to the consumer that relate specifically to them.

Figure 9:
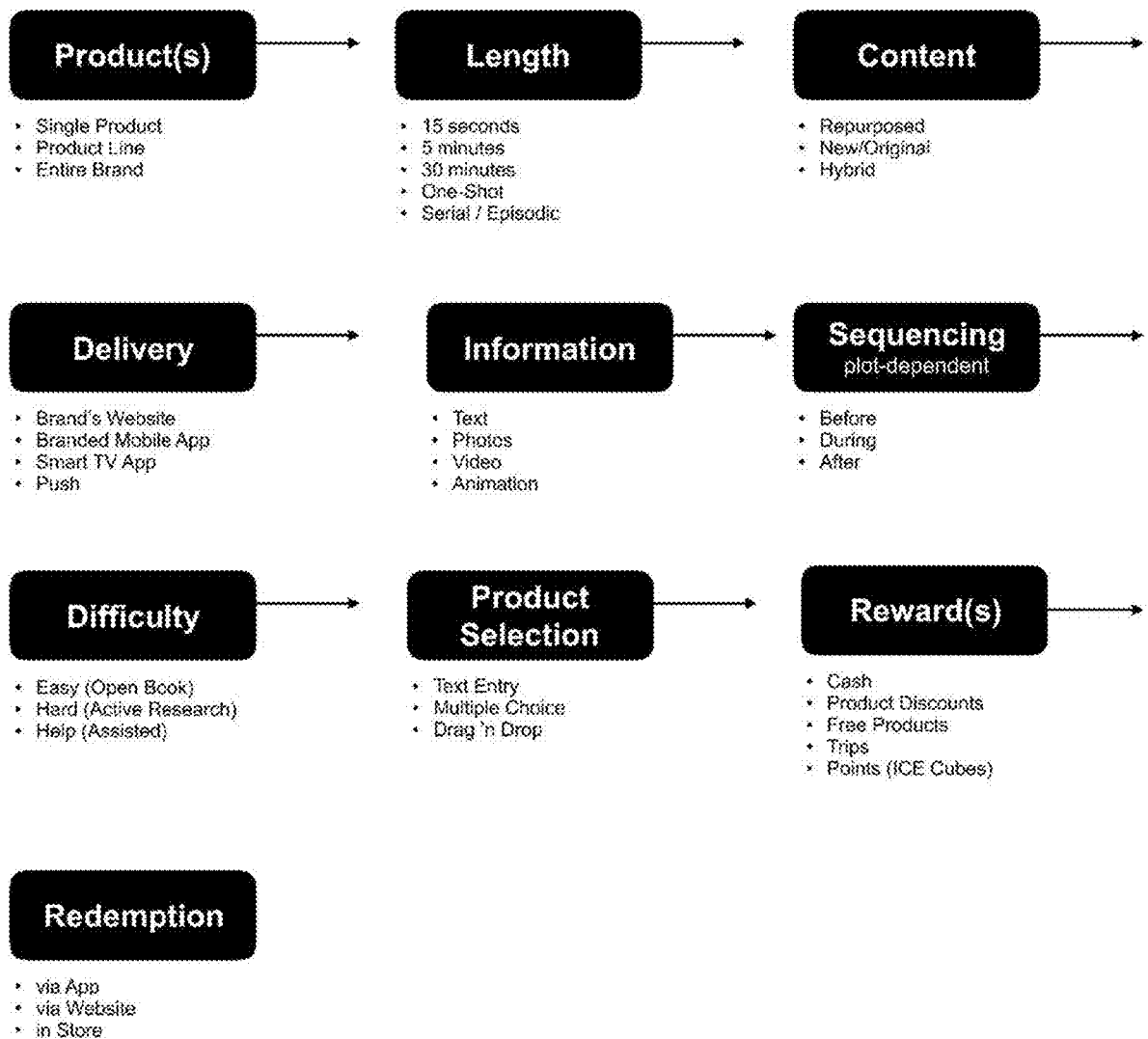
FIG. 9 displays the flow of the process.

The flow of the process of the current invention is shown in FIG. 9. This information includes decisions made regarding the product line or brand, the length of time of the process (in seconds or minutes, one shot or a episodic serial), whether the content is repurposed, new or hybrid, how it is delivered (such as a website, mobile app, smart TV app or a media push), what type of information is presented and in what form (text, photos, video or animation), the sequencing of the interactive product information (is it presented before, during or after the performance of an event). If it is in a game or questionnaire form, is the difficulty level easy, hard, or hard with helpful hints. The process also includes decisions on product selection (for example, whether it is text/entry, multiple choice or drag and drop), the rewards to the customer (which can include cash, product discounts, free products, trips or points), and how to redeem those rewards.

Through their engagement with the interactive gamefied branded content (as well as via their pre-existing profile data), the content recommended for each user will become more and more relevant to their preferences. This is made possible by a communal rating system, where users who choose to engage with similar interactive gamefied branded content will be recommended similar interactive gamefied branded content. The profiled recommendations are designed to ensure each user engages with the most relevant content to them, and thereby reduces and/or eliminates unwanted content.

Figure 10:
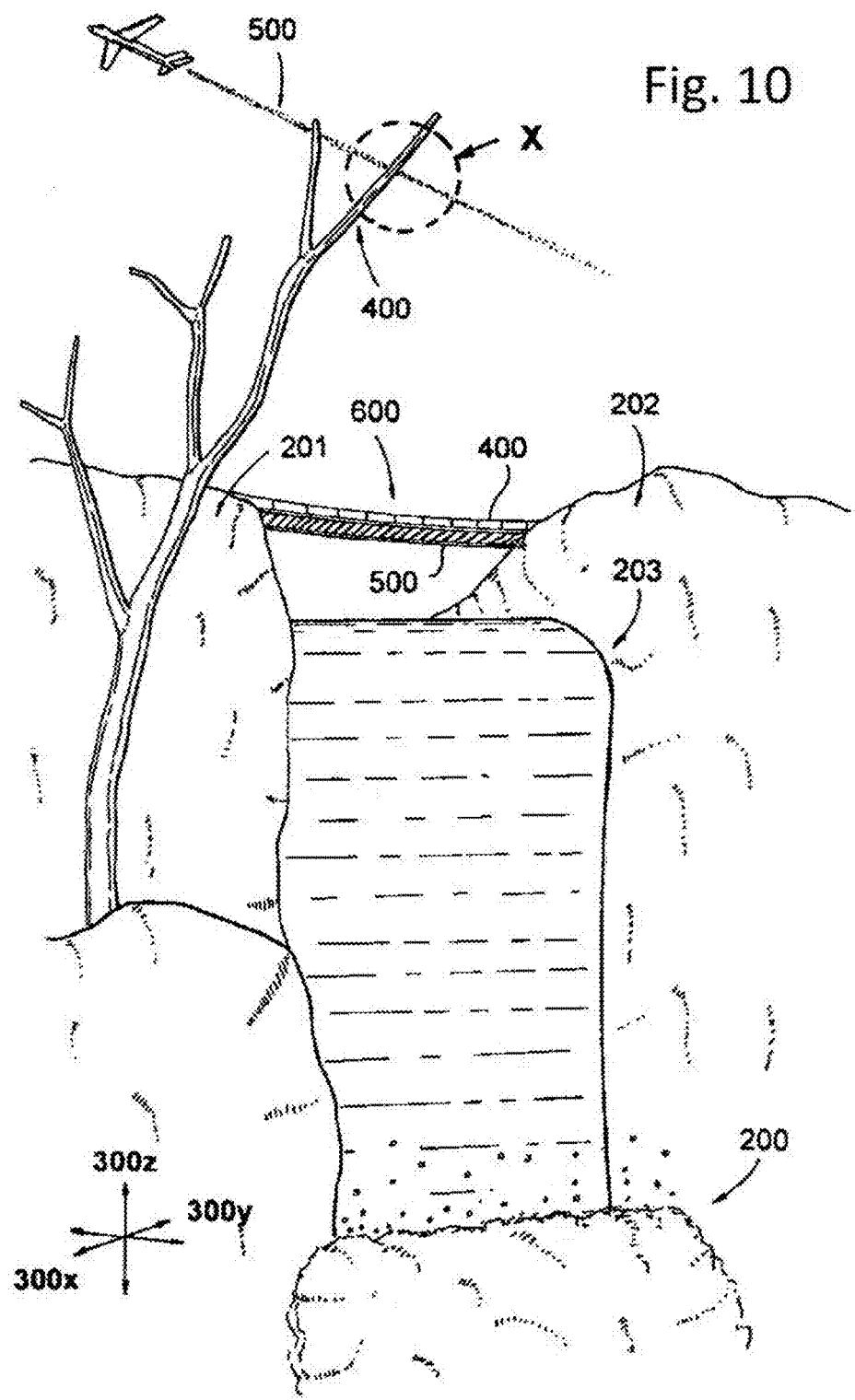
FIG. 10 is a diagrammatic perspective view of an optical geometric embodiment of the present invention.

Other visual concepts that can be employed in assisting the players during game play are illustrated in FIG. 10 that shows a diagrammatic perspective view of an optical geometric scene. This scene can be in game or a location in real lift such as a store, park or restaurant.

The user can interactively proceed through selected optical three-dimensional geometric oriented locations. At each location, such as gorge ravine 200, the visual field participant user can be divided up into discrete segmented locations 300 x, 300 y, 300 z, such as a cubic grid in x, y, z three dimensional axes. At each location denoted by coordinates 300 x, 300y, 300 z, the user can choose to advance further in the game by moving discrete units of information, such as lines, curved shapes such as circles or ovals, or intersected lines, and use these discrete units of information to expand upon and overlay them upon the three dimensional geometric oriented location. Instead of coordinates, locations can also be given real life directions such as down a street or a street address or longitude and latitude. Thus, while descending hiking steps within a virtual gorge 200 having imaginary high cliffs 201, 202 divided by a waterfall 203, the player can build a virtual bridge 600 with linear lines 400 and/or 500 across the gorge 200 to proceed further in the game.

The game or event can drive users to locations that person directing the event or game or the advertisers want the users to go to, such as a store.

In addition, clues indicating how a player should proceed next may be embedded in the scene. For example, a portion of a tree branch 400 can be intersected with a linear jet exhaust stream 500, to produce an "X", shown encircled. This "X" can be placed at strategic locations within the three dimensional grid to indicate a location where the player should travel next.

As to a further discussion of the manner of usage and operation of the present invention, the same should be apparent from the above description. Accordingly, no further discussion relating to the manner of usage and operation will be provided. With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

That which is claimed is:

1. A method of delivering an event, the method comprising the steps of:
    tracking geographical boundaries within which a terminal device associated with a user is located;
    capturing, via a global positioning system unit associated with the terminal device, a location-based trigger associated with an interactive multimedia content;
    based on the geographical boundaries and the capturing, determining that the terminal device is located within a predefined geofence, the predefined geofence being associated with the location-based trigger to launch the interactive multimedia content;
    based on the location-based trigger, sending a notification associated with the interactive multimedia content to the terminal device;
    in response to an opening of the notification on the terminal device, running an event on the terminal device via a user interface associated with the terminal device, the event comprising the interactive multimedia content, the interactive multimedia content being provided via a server farm, wherein the server farm is configured to store a profile of the user;
    providing, via the user interface, a three dimensional grid comprising a plurality of pre-defined three-dimensional geometric oriented locations associated with the event;
    providing, via the user interface, a plurality of discrete information units on the plurality of pre-defined three-dimensional geometric oriented locations;
    receiving, via the user interface, a user action performed by the user with regard to one of the plurality of discrete information units associated with one of the plurality of pre-defined three-dimensional geometric oriented locations, the user action including at least modifying the one of the plurality of discrete information units via the user interface;
    based on the user action, presenting, via the user interface, further pre-defined three-dimensional geometric oriented locations of the plurality of pre-defined three-dimensional geometric oriented locations to the user to enable the user to proceed in the event;
    tracking themes of the interactive multimedia content at each time interval;
    based on the tracking and the profile of the user, selecting, from a plurality of products, one or more products, wherein the one or more products have product information related to a theme of the interactive multimedia content reproduced at a current time interval;
    based on the selecting, providing the product information associated with the one or more products during the event to the terminal device;
    wherein providing the interactive multimedia content includes presenting a scenario associated with the theme to the user, the scenario requiring a selection, by the user, of at least one of the one or more products having the product information corresponding to the scenario and the theme;
    receiving, from the terminal device, the selection of the at least one of the one or more products, the user making the selection based on reviewing the theme, the scenario, and the product information associated with the one or more products; and
    based on the receipt of the selection, providing a reward to the user, wherein the reward is partially provided in response to providing, by the user, personal information for the profile.

2. The method of claim 1 wherein said interactive multimedia content is provided through an online portal.

3. The method of claim 1 wherein said interactive multimedia content combines branded entertainment, gaming, and direct response advertising to be viewed and interacted with by the user.

4. The method of claim 1 wherein said interactive multimedia content provides an eCommerce component which provides rewards.

5. The method of claim 4 wherein the user can redeem the rewards.

6. The method of claim 1 wherein an advertiser sponsors said interactive multimedia content.

7. The method of claim 1 wherein the interactive multimedia content is based on the user's input and interactions.

8. An apparatus to deliver events, the apparatus comprising:
- at least one central processing unit configured to:
  - track geographical boundaries within which a gaming device associated with a user is located;
  - capture, via a global positioning system unit associated with the gaming device, a location-based trigger associated with an interactive multimedia content;
  - based on the geographical boundaries and the capturing, determine that the gaming device is located within a predefined geofence, the predefined geofence being associated with the location-based trigger to launch the interactive multimedia content;
  - based on the location-based trigger, send a notification associated with the interactive multimedia content to the gaming device;
  - in response to an opening of the notification on the gaming device, run an event on the gaming device, the event comprising the interactive multimedia content, the interactive multimedia content being provided via a server farm, wherein the server farm is configured to store a profile of the user;
  - provide, via the user interface, a three dimensional grid comprising a plurality of pre-defined three-dimensional geometric oriented locations associated with the event;
  - provide, via the user interface, a plurality of discrete information units on the plurality of pre-defined three-dimensional geometric oriented locations;
  - receive, via the user interface, a user action performed by the user with regard to one of the plurality of discrete information units associated with one of the plurality of pre-defined three-dimensional geometric oriented locations, the user action including at least modifying the one of the plurality of discrete information units via the user interface;
  - based on the user action, present, via the user interface, further pre-defined three-dimensional geometric oriented locations of the plurality of pre-defined three-dimensional geometric oriented locations to the user to enable the user to proceed in the event;
  - track themes of the interactive multimedia content at each time interval;
  - based on the tracking and the profile of the user, select, from a plurality of products, one or more products, wherein the one or more products have product information related to a theme of the interactive multimedia content reproduced at a current time interval;
  - based on the selecting, provide the product information associated with the one or more products during the event to the gaming device;
  - wherein providing the interactive multimedia content includes presenting a scenario associated with the theme to the user, the scenario requiring a selection, by the user, of at least one of the one or more products having the product information corresponding to the scenario and the theme;
  - receive, from the gaming device, the selection of the at least one of the one or more products, the user making the selection based on reviewing the theme, the scenario, and the product information associated with the one or more products; and
  - based on the receipt of the selection, providing a reward to the user, wherein the reward is partially provided in response to providing, by the user, personal information for the profile;
- at least one storage device to store information on said gaming device;
- at least one display device having a screen to facilitate an output of said gaming device; and
- at least one input device to facilitate interaction of the user with said gaming device.

9. The apparatus as in claim 8 wherein said at least one input device is a touchscreen.

10. The apparatus as in claim 8 wherein said at least one input device is a motion sensor.

11. The apparatus as in claim 8 wherein said at least one input device is a biometric sensor.

12. The apparatus in claim 8 wherein said product information for the one or more products is delivered through augmented or virtual reality.

13. The apparatus as in claim 8 wherein said product information for the one or more products is delivered through geo-spatial technology.

14. The apparatus as in claim 8 wherein said event is accessed through one of a text hyperlink and a graphic hyperlink.

15. The apparatus as in claim 8 wherein said event is accessed through image or sound recognition software.

16. The apparatus of claim 8 wherein said interactive multimedia content provides an eCommerce component which provides rewards to be redeemed by the user.

* * * * *